United States Patent
Ye

(10) Patent No.: US 12,140,174 B2
(45) Date of Patent: Nov. 12, 2024

(54) LOCK NUT

(71) Applicant: Chunlin Ye, Yiwu (CN)

(72) Inventor: Chunlin Ye, Yiwu (CN)

(*) Notice: Subject to any disclaimer, the term of this patent is extended or adjusted under 35 U.S.C. 154(b) by 179 days.

(21) Appl. No.: 17/574,523

(22) Filed: Jan. 12, 2022

(65) Prior Publication Data

US 2022/0136555 A1    May 5, 2022

Related U.S. Application Data

(63) Continuation of application No. PCT/CN2020/101045, filed on Jul. 9, 2020.

(30) Foreign Application Priority Data

Jul. 13, 2019  (CN) .......................... 201910632550.8

(51) Int. Cl.
  *F16B 39/12*    (2006.01)
  *F16B 39/02*    (2006.01)
  *F16B 39/16*    (2006.01)

(52) U.S. Cl.
  CPC ............ *F16B 39/16* (2013.01); *F16B 39/025* (2013.01)

(58) Field of Classification Search
  CPC ........ F16B 39/36; F16B 39/12; F16B 39/126; F16B 39/122
  USPC ........ 411/265, 266, 270, 278–280, 223, 237, 411/238
  See application file for complete search history.

(56) References Cited

U.S. PATENT DOCUMENTS

| | | | | |
|---|---|---|---|---|
| 256,767 A | * | 4/1882 | Timny ................... | F16B 39/36 411/270 |
| 502,477 A | * | 8/1893 | Tolan .................... | F16B 39/025 411/242 |
| 897,168 A | * | 8/1908 | Smith .................... | F16B 39/12 411/222 |
| 914,053 A | * | 3/1909 | Kenyon ................. | F16B 39/16 411/932 |
| 1,328,401 A | * | 1/1920 | Savidge ................. | F16B 39/36 411/222 |
| 1,523,146 A | * | 1/1925 | Stevenson ............... | F16B 39/36 411/270 |
| 1,569,237 A | * | 1/1926 | Ravier ................... | F16B 39/36 411/935 |

(Continued)

FOREIGN PATENT DOCUMENTS

| | | |
|---|---|---|
| CH | 285241 A | 8/1952 |
| CN | 2692400 Y | 4/2005 |

(Continued)

*Primary Examiner* — Flemming Saether

(57) ABSTRACT

A lock nut includes: a first nut having a tapered cavity; and a second nut including a base portion and a tapered lug boss arranged the base portion. The tapered lug boss can be coupled inside the tapered cavity. The first and second nuts are used in pair by self-locking. A straight slot is formed in the lug boss. Under the locking action of the first nut, the straight slot is deformed to further lock a bolt, or is discontinuously engaged with teeth of the bolt to increase an effective stress surface and locking performance of the second nut for locking the bolt. A convex reinforcing rib extends on a first surface of the first nut. An annular groove is formed in a second surface of the second nut. The convex reinforcing rib is coupled with the annular groove to enhance the strength and reliability of locking.

5 Claims, 5 Drawing Sheets

(56) References Cited

U.S. PATENT DOCUMENTS

| | | | | |
|---|---|---|---|---|
| 1,820,965 A | * | 9/1931 | D'Halloy | F16B 39/12 |
| | | | | 411/270 |
| 2,605,804 A | * | 8/1952 | Woodling | F16B 39/36 |
| | | | | 411/270 |
| 3,225,809 A | * | 12/1965 | Peak, Sr. | F16B 39/36 |
| | | | | 411/270 |
| 6,546,766 B1 | | 4/2003 | Klingler | |
| 7,261,506 B2 | * | 8/2007 | Smolarek | F16B 39/282 |
| | | | | 411/187 |
| 7,437,976 B1 | * | 10/2008 | Goldbaum | F16B 39/32 |
| | | | | 411/237 |
| 8,899,896 B1 | | 12/2014 | Campau | |
| 9,016,096 B2 | | 4/2015 | Winnie | |

FOREIGN PATENT DOCUMENTS

| | | |
|---|---|---|
| CN | 202176595 U | 3/2012 |
| CN | 207033950 U | 2/2018 |
| CN | 208456998 U | 2/2019 |
| CN | 110259804 A | 9/2019 |
| CN | 111365352 A | 7/2020 |
| GB | 433699 A | 8/1935 |

\* cited by examiner

LOCK NUT

CROSS-REFERENCE TO RELATED APPLICATIONS

This application is a continuation of International Patent Application No. PCT/CN2020/101045 with a filing date of Jul. 9, 2020, designating the United States, now pending, and further claims priority to Chinese Patent Application No. 201910632550.8 with a filing date of Jul. 13, 2019. The content of the aforementioned applications, including any intervening amendments thereto, are incorporated herein by reference.

TECHNICAL FIELD

The present disclosure relates to the field of preventing loosening in the use of bolts and nuts, and in particular, relates to a lock nut.

BACKGROUND ART

Various bolts and nuts can be seen everywhere, and screws are even called "rice of industry". Although having a small size, bolts and nuts play a tremendous actual role. Especially in some important occasions relating to safety, including various high-tech objects, the reliability of bolts and nuts is crucial. Once a bolt and a nut loosen or fall off, it may cause fatal damage to equipment. A specific problem that needs to be treated seriously is how to prevent loosening of a bolt and a nut reliably and effectively. There are quite a number of ready-made available products and existing technical solutions. However, different application occasions have significantly different requirements, and various existing bolts and nuts capable of preventing loosening and relevant technical solutions each have own strong points, for example, "nuts that never loosen" developed by Hard Lock in Japan. According to the comments on the Internet, the so-called Hard Lock fastener actually works depending on two nuts, with a second nut locking a first nut by means of eccentric pressure to prevent loosening. However, when eccentric pressure is applied, engaging threads of a nut and a bolt will inevitably tend to one side, and the threads will be unevenly stressed. Meanwhile, in addition to normal tensile stress, a bolt will bear additional bending stress in use. This will severely affect the fatigue strength (i.e., long-term working capacity under alternating forces) of the fastener and will inevitably results in shortened fatigue life of the bolt.

SUMMARY

An objective of the present disclosure is to solve the problems in preventing loosening of nuts in the prior art and provide a nut that is reasonable, simple, reliable, feasible, and highly universal, and that will not loosen.

To achieve the above-mentioned objective, the present disclosure is mainly implemented by using the following technical solutions to solve the problems. A lock nut includes: a first nut having a tapered cavity; and a second nut that including a base portion and a tapered lug boss arranged on the base portion. The tapered lug boss can be coupled inside the tapered cavity. The first nut and the second nut are used in pair by self-locking. A straight slot is formed in the lug boss. Under the locking action of the first nut, the straight slot is deformed to further lock a bolt, or is discontinuously engaged with teeth of the bolt to increase an effective stress surface and locking performance of the second nut for locking the bolt. A convex reinforcing rib extends on a first surface, facing the second nut, of the first nut. An annular groove is formed in a second surface, facing the first nut, of the second nut. The convex reinforcing rib is coupled with the annular groove to enhance the strength and reliability of locking.

For the taper of each of the tapered cavity and the tapered lug boss, a safety factor to be selected may be added under the premise of a self-locking angle depending on the size and the application occasion of a nut. For the open straight slot, a reasonable number of such slots, and a shape and a size thereof can be set depending on the size and the application occasion of a nut, and equal distribution of such slots may be conducive to formation of balanced locking force for a bolt. An annular press-fit convex-concave reinforcing ribs can be designed into a trapezoid shape, a semi-circular shape or a triangle shape convenient for manufacturing depending on the size and the application occasion of a nut.

Preferably, a difference is provided between a taper value of the tapered cavity and that of the tapered lug boss to eliminate a gap between teeth of the nut and the bolt so that a bolt can be locked more tightly and reliably after the first and second nuts are locked together. This may be more conducive to engagement.

Preferably, to form the annular press-fit convex-concave reinforcing rib, in the nut having the lug boss, an annular reinforcing rib cavity may be formed such that it extends at the same taper with the lug boss, and an annular convex reinforcing rib matching the annular reinforcing rib cavity may be formed on the nut having the cavity, thus being conducive to increasing an effective locking hold-down surface and enhancing the strength and locking reliability of the nut having the cavity.

Preferably, the annular press-fit convex-concave reinforcing rib can be obliquely trapezoidal wedge-shaped with a bottom angle thereof being a rounded corner, thus being conducive to increasing an effective locking surface of the nut, guaranteeing the strength of the reinforcing rib and improving the locking reliability.

Preferably, a rear flat surface of locked double nuts used in pair or a rear flat surface of one of them is formed into a one-way non-return structure for preventing loosening, thus being conducive to improving the loosening prevention effectiveness of the nuts.

Preferably, an elastic washer for preventing loosening that matches the one-way non-return structure for preventing loosening can be added under the one-way non-return structure for preventing loosening, thus being conducive to improving the loosening prevention performance of the nut and enhancing the reliability.

The present disclosure grasps key points for solving the problems. Using a reasonable, simple, reliable and feasible structural form, a bolt may be locked with double nuts on the basis of multi-aspect complementation and wedge-type reinforcement. Thus, an effective locking area is sufficiently increased for the bolt, and locking performance is improved accordingly. The shortcoming of a traditional fastener that stress is mostly concentrated on first and second teeth after a nut is screwed down thereon is overcome. The locking may be implemented in steps or flexibly handled according to different situations. Specifically, the overall solution is principally characterized by uniform locking strength and high reliability. The nuts can be prevented from loosening after being screwed down without damage to the normal performance indicators of the bolt. It is apparent that the nuts are suitable for use in positions that Hard Lock nuts do not fit.

The present disclosure has the following beneficial effects: by identifying an effective method for solving problems and grasping the essential points for solving problems, using a reasonable, simple and feasible structure, a bolt can be locked with double nuts on the basis of multi-aspect complementation and wedge-type reinforcement, and nuts can be prevented from loosening without damage to the normal performance of the bolt.

LIST OF REFERENCE NUMERALS

1—first nut, 11—tapered cavity, 12—first surface, 13—convex reinforcing rib, 14—one-way non-return structure for preventing loosening, 2—second nut, 21—base portion, 22—tapered lug boss, 23—straight slot, 24—second surface, 25—annular groove, 3—bolt, and 4—elastic washer.

DETAILED DESCRIPTION OF THE EMBODIMENTS

A nut that does not loosen will be further described below in conjunction with the figures.

Figure 1:
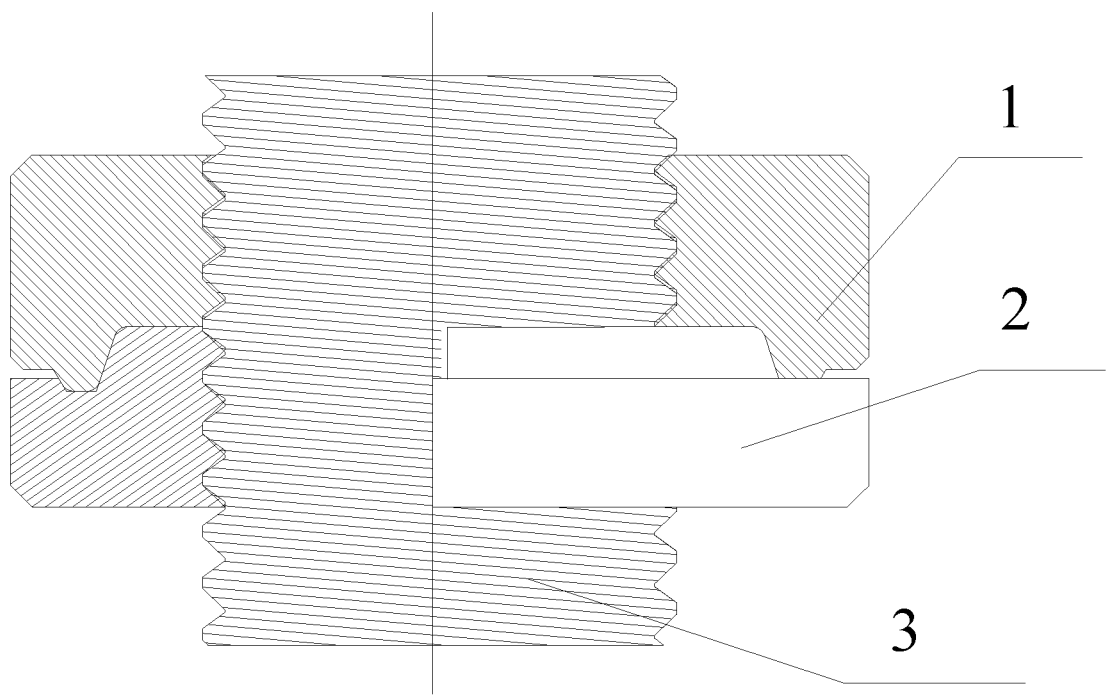
FIG. 1 is a schematic diagram of a nut that does not loosen according to the present disclosure.
Figure 2:
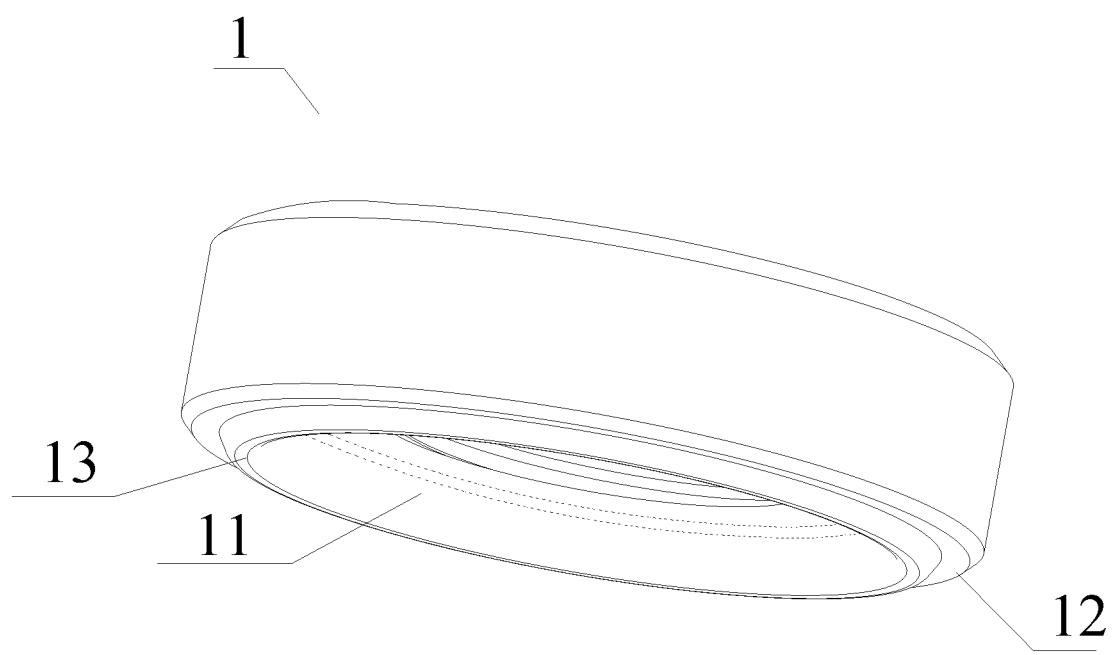
FIG. 2 is a structure diagram of a first nut according to the present disclosure.
Figure 3:
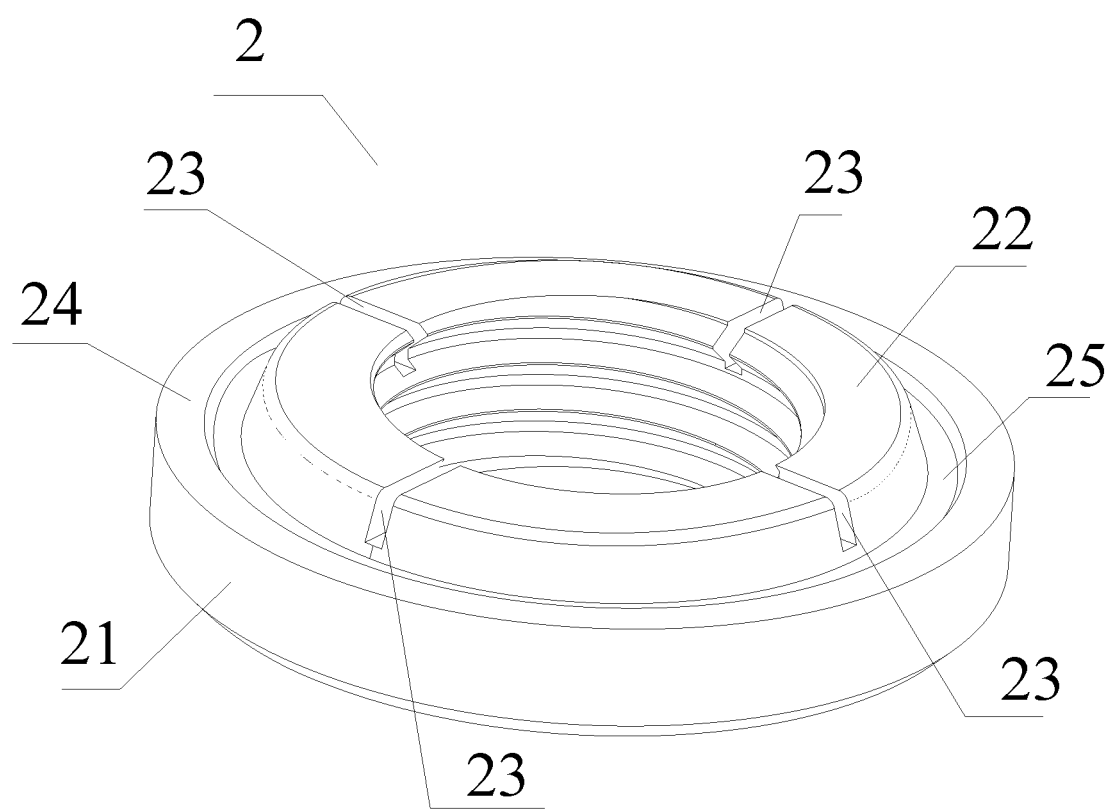
FIG. 3 is a structure diagram of a second nut according to the present disclosure.
Figure 4:
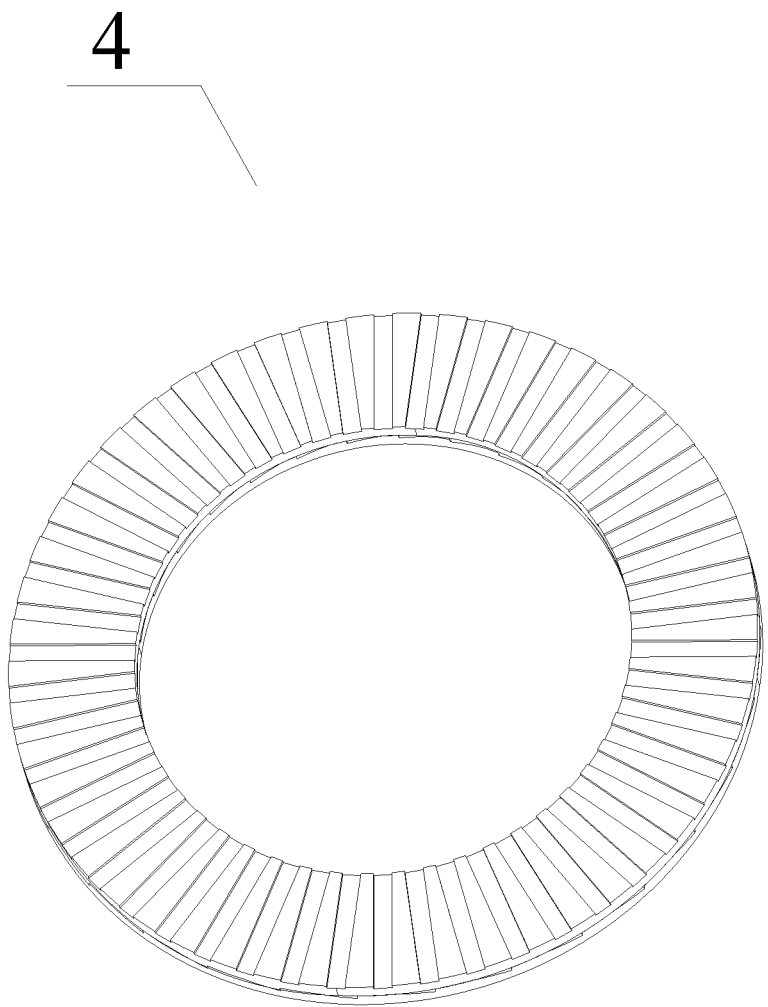
FIG. 4 is a structure diagram of an elastic washer.
Figure 5:
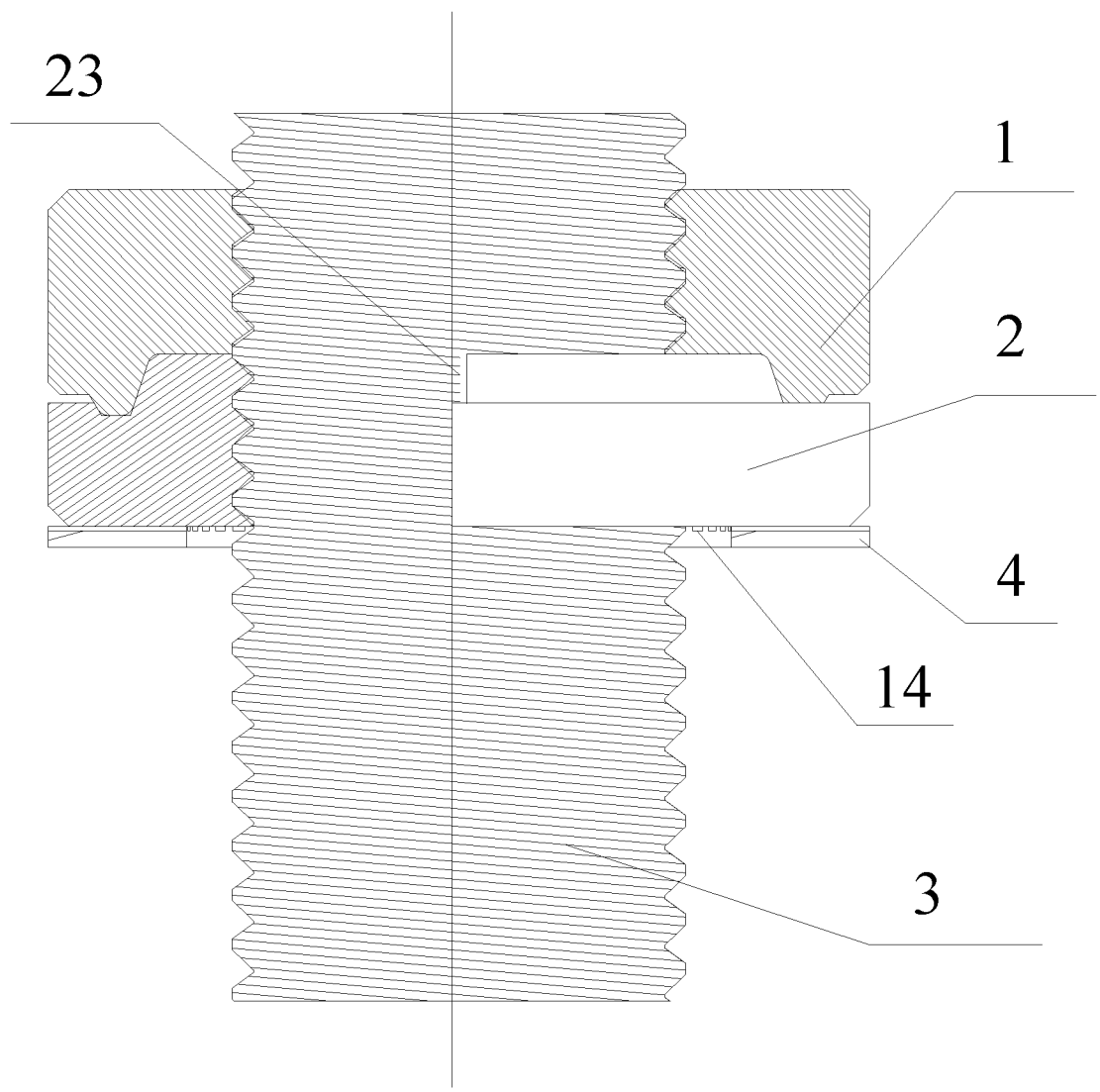
FIG. 5 is a structure diagram of a lock nut according to the present disclosure.

As shown in FIG. 1 to FIG. 5, a nut that does not loosen is of a double-nut structure and includes a first nut 1 and a second nut 2. The first nut 1 and the second nut 2 are used in pair by self-locking. The first nut 1 that has a tapered cavity 11. The second nut 2 includes a base portion 21 and a tapered lug boss 22 arranged on base portion 21. The tapered lug boss 22 can be coupled inside the tapered cavity 11. An open straight slot 23 is formed in the lug boss 22. Under the locking action of the matching first nut 1, the lug boss 22 can be deformed to further lock a bolt 3, or is discontinuously engaged with teeth of the bolt 3 to increase an effective stress surface and locking performance of the nuts 1 and 2 for locking the bolt 3. The number of the straight slot 23 can be selected according to actual use, and it is not limited here. The reliability of the overall effectiveness of the nut that does not loosen can be guaranteed by the tapered ring wedge-type locking and uniform strength features of the double nuts 1 and 2, and the expected purpose of preventing the nuts 1 and 2 from loosening after locking can be achieved using a structural form without damage to the normal characteristics of the bolt 3.

A convex reinforcing rib 13 extends on a first surface 12, facing the second nut 2, of the first nut 1. An annular groove 25 is formed in a second surface 24, facing the first nut 1, of the second nut 2. The convex reinforcing rib 13 is coupled with the annular groove 25 to enhance the strength and reliability of locking.

The taper of each of the tapered cavity 11 and the lug boss 22 of the double nuts 1 and 2 used in pair is chosen here according to Morse's taper, and a taper deviation correction value of 0.5 degree for a gap between teeth is used between the first nut 1 and the second nut 2. For the open straight slot 23, two 1 mm wide open straight slots equally split in half are used here. To form an annular press-fit convex-concave reinforcing rib, in the second nut 2, a ring-shaped, obliquely trapezoidal reinforcing rib cavity with a small rounded corner is formed such that it extends at the same taper with the lug boss, and a matching ring-shaped, obliquely trapezoidal convex reinforcing rib with a small rounded corner is formed on the first nut 1. The structural features of the present disclosure are oriented around the overall objective, and the main features listed and preferred ones are only expressed as a frame for solving the technical problems of the present disclosure, and they can be appropriately adjusted and selected and substantially improved according to specific conditions during implementation to better meet the actual different needs in reality. To achieve better reliability of the present disclosure in use, a single wedge-shaped structural member may be added to the open straight slot, or a ring-shaped integrated structural member may be provided according to the number of the open straight slots, thus enhancing the locking effect on the bolt 3. Alternatively, to facilitate engagement of the nuts 1 and 2 with the bolt and improve self-locking, an inclined surface structure can be added to the tips of the thread teeth of the nuts 1 and 2.

In one embodiment of the present disclosure, a rear flat surface of locked double nuts used in pair or a rear flat surface of one of them is formed into a one-way non-return structure 14 for preventing loosening, thus being conducive to improving the loosening prevention effectiveness of the nuts. An elastic washer 4 for preventing loosening that matches the one-way non-return structure for preventing loosening is added under the one-way non-return structure 14 for preventing loosening, thus being conducive to improving the loosening prevention effectiveness of the nut and enhancing the reliability.

Obviously, those skilled in the art can make various alterations to the structural arrangement of the present disclosure without departing from the spirit and scope of the present disclosure. Accordingly, the present disclosure is intended to cover these alterations provided that they fall within the technical scope defined by the appended claims and equivalents thereof.

What is claimed is:
1. A lock nut, comprising:
a first nut (1) having a tapered cavity (11); and
a second nut (2) comprising a base portion (21) and a tapered lug boss (22) arranged on the base portion (21), wherein the tapered lug boss (22) is capable of being coupled inside the tapered cavity (11);
the first nut (1) and the second nut (2) are used in pair by self-locking; each of the first nut (1) and the second nut (2) has an internal thread configured to engage with an external thread of a bolt;
a straight slot (23) is formed in the lug boss (22); under the locking action of the first nut (1), the straight slot (23) is deformed to further lock the bolt, or is discontinuously engaged with the external thread of the bolt to increase an effective stress surface and locking performance of the second nut (2) for locking the bolt;
a convex reinforcing rib (13) extends on a first surface (12), facing the second nut (2), of the first nut (1); an annular groove (25) is formed in a second surface (24), facing the first nut (1), of the second nut (2); and the convex reinforcing rib (13) is coupled with the annular groove (25) to enhance a strength and reliability of locking; wherein the annular groove (25) has a continuous annular external wall; a slope of an inner surface of the continuous annular external wall is equal to a slope of an outer surface of the convex reinforcing rib (13), such that the inner surface of the continuous annular external wall matches and supports the outer surface of the convex reinforcing rib (13) to strengthen the convex reinforcing rib (13) and enhance a strength of the first nut (1) and an overall locking effect;

the first nut (1) and the second nut (2) have a same outer diameter; a height from a bottom of the annular groove (25) to a top surface of the lug boss (22) is greater than a height from the bottom of the annular groove (25) to the second surface (24); a height from a bottom of the tapered cavity (11) to a top surface of the convex reinforcing rib (13) is greater than a height from the first surface (12) to the top surface of the convex reinforcing rib (13).

2. The lock nut according to claim 1, wherein a difference is provided between a taper value of the tapered cavity (11) and a taper value of the tapered lug boss (22) to eliminate a gap between the internal thread of the lock nut and the external thread of the bolt so that the bolt is capable of being locked more tightly and reliably after the first and second nuts are locked together.

3. The lock nut according to claim 1, wherein the convex reinforcing rib (13) is an obliquely trapezoidal wedge-shaped rib.

4. The lock nut according to claim 1, wherein an one-way non-return structure (14) for preventing loosening is formed on a rear flat surface of at least one of the first nut (1) and the second nut (2).

5. The lock nut according to claim 4, further comprising an elastic washer (4) for preventing loosening that matches the one-way non-return structure (14) for preventing loosening.

\* \* \* \* \*